United States Patent
Wang et al.

(10) Patent No.: US 7,586,494 B2
(45) Date of Patent: Sep. 8, 2009

(54) SURFACE DETAIL RENDERING USING LEAP TEXTURES

(75) Inventors: Xi Wang, Beijing (CN); Xin Tong, Beijing (CN); Stephen S. Lin, Beijing (CN); Baining Guo, Beijing (CN)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 11/276,931

(22) Filed: Mar. 17, 2006

(65) Prior Publication Data

US 2007/0216680 A1 Sep. 20, 2007

(51) Int. Cl.
*G09G 5/00* (2006.01)
(52) U.S. Cl. .................. 345/581; 345/420; 345/424; 345/582
(58) Field of Classification Search ............. 345/418, 345/419, 424, 581, 420
See application file for complete search history.

(56) References Cited

U.S. PATENT DOCUMENTS

| | | | | |
|---|---|---|---|---|
| 6,285,378 B1 * | 9/2001 | Duluk, Jr. | ............. | 345/441 |
| 7,042,456 B2 * | 5/2006 | Chen et al. | ............. | 345/441 |
| 7,133,041 B2 * | 11/2006 | Kaufman et al. | ............. | 345/419 |
| 7,136,064 B2 * | 11/2006 | Zuiderveld | ............. | 345/424 |
| 2003/0234784 A1 * | 12/2003 | Grzeszczuk et al. | ............. | 345/426 |
| 2005/0280646 A1 * | 12/2005 | Wang et al. | ............. | 345/420 |
| 2006/0028468 A1 * | 2/2006 | Chen et al. | ............. | 345/424 |
| 2006/0290719 A1 * | 12/2006 | Tong et al. | ............. | 345/694 |

OTHER PUBLICATIONS

William Donnelly, "Per-Pixel Displacement Mapping with Distance Functions," NVIDIA GPU Gems 2, 2005, pp. 123-136.
Fabio Policarpo, Manuel M. Oliveira, and Joao L.D. Comba, "Real-Time Relief Mapping on Arbitrary Polygonal Surfaces," ACM Symposium on Interactive 3D Graphics, 2005, pp. 155-162.
Xi Wang, Xin Tong, Stephin Lin, Shimin Hu, Baining Guo, Heung-Yeung Shum, "Generalized Displacement Maps," Eurographics Symposium on Rendering, Jun. 2004.

* cited by examiner

*Primary Examiner*—Xiao M Wu
*Assistant Examiner*—Abderrahim Merouan
(74) *Attorney, Agent, or Firm*—Lee & Hayes, PLLC

(57) ABSTRACT

The present surface detail rendering technique provides an efficient technique for applying a mesostructure to a macrostructure for an object that minimizes the amount of memory required for pre-computed data. A leap texture is pre-computed for a mesostructure by classifying each voxel in the mesostructure geometry and assigning a value in the leap texture based upon the classification. The value in the leap texture represents a distance to jump along a ray cast in any view direction when a model is decorated with the mesostructure geometry.

19 Claims, 9 Drawing Sheets

SURFACE DETAIL RENDERING USING LEAP TEXTURES

BACKGROUND

Computer graphics and image processing techniques continually attempt to create photorealistic images. In many applications, these photorealistic images need to be rendered in real time. For example, animated characters in video games need to be rendered in real time. In order to achieve photorealistic images, mesostructures are applied to create the appearance of real-world materials and objects. Mesostructures are fine scale surface geometries. For example, different mesostructures may simulate wood, brick, or the like. Thus, when images are rendered with mesostructures applied, the objects obtain realistic surface details.

In overview, each object in an image may be represented as a set of polygonal or parameterized surfaces. This geometric model of the objects is commonly referred to as a macrostructure level. The mesostructure level is used to model details that are too small to be modeled efficiently by polygons. Several techniques have been developed over the past several years for real-time rendering of mesostructures. Each of these techniques faces the difficult tradeoff between the number of geometric primitives and the storage of pre-computed data.

For example, remeshing and slicing create a large amount of additional primitives over the original mesh (i.e., the macrostructure) in order to represent the detailed geometry (i.e., the mesostructure). These additional primitives add processing workload in a vertex engine and thus, hurt performance. Other techniques, such as bi-directional texture functions (BTF), view-dependent displacement mappings (VDM), and generalized displacement maps (GDM) use pre-computed high dimensional data calculated using a mesostructure sample. Because the data is pre-computed, the vertex engine does not suffer from additional processing workload and the rendering of the detailed geometry is accelerated in comparison to remeshing or slicing. However, the drawback of using pre-computed data is that the data consumes a significant amount of memory. Therefore, rendering techniques that use pre-computed data have difficulty in industrial applications where there is limited memory, such as for games and movies.

Thus, even with all the advances, there is a continual need to improve upon the surface detail rendering techniques for use in real-time applications.

SUMMARY

The present surface detail rendering technique provides an efficient technique for applying a mesostructure to a macrostructure for an object that minimizes the amount of memory required for pre-computed data. A leap texture is pre-computed for a mesostructure by classifying each voxel in the mesostructure geometry and assigning a value in the leap texture based upon the classification. The value in the leap texture represents a distance to jump along a ray cast in any view direction when a model is decorated with the mesostructure geometry.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments are described with reference to the following figures, wherein like reference numerals refer to like parts throughout the various views unless otherwise specified. For convenience, the left-most digit of a component reference number identifies the particular Figure in which the component first appears.

DETAILED DESCRIPTION

The following description is directed at a surface detail rendering technique for applying a mesostructure over a macrostructure of an object. In contrast with prior techniques that pre-compute data for each of several viewing directions, the present surface detail rendering technique pre-computes a leap texture that may be used for applying the mesostructure in multiple viewing directions. Thus, by using the present technique, the amount of pre-computed data is minimized while still achieving photorealistic images. These and other aspects of the present surface detail rendering technique are now described in detail.

Figure 1:
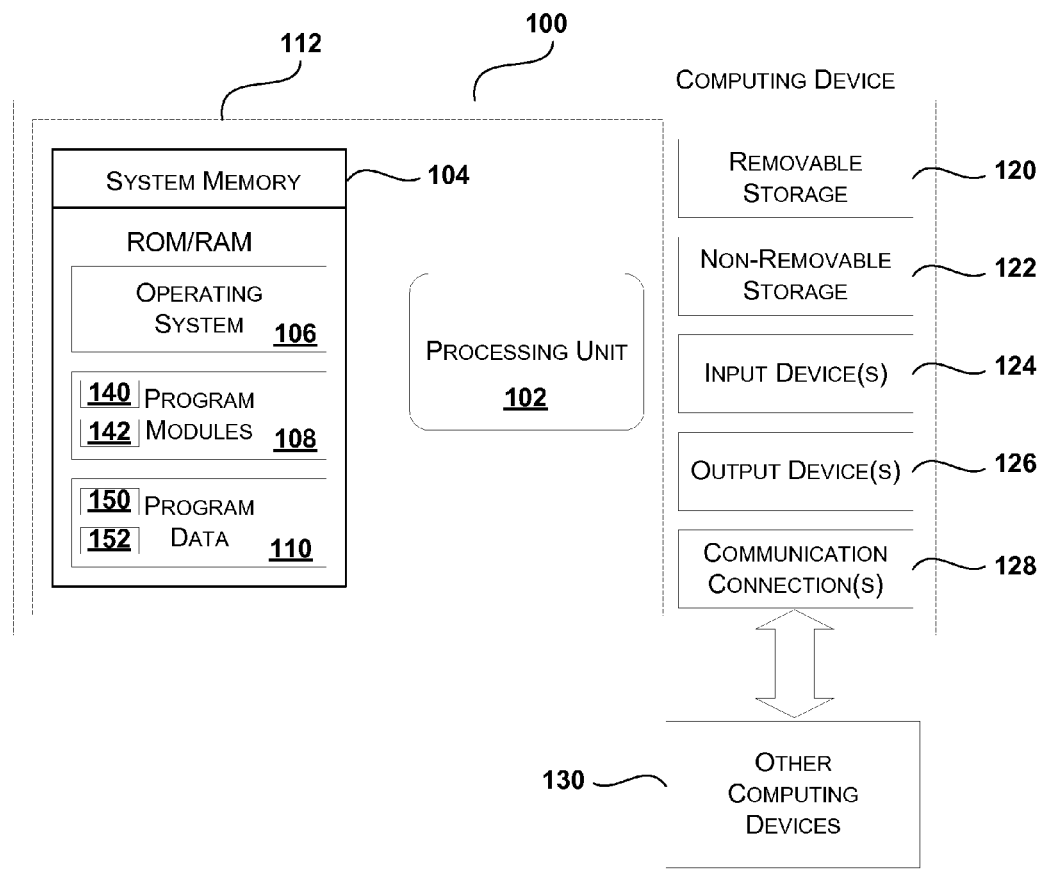
FIG. 1 is an illustrative system that may be used to implement the surface detail rendering technique described herein.

FIG. 1 is an illustrative system that may be used to implement the surface detail rendering technique described herein. The system includes a computing device, such as computing device 100. Computing device 100 represents any type of computing device such as a personal computer, a laptop, a server, a game console, a handheld or mobile device (e.g., a cellular phone, digital assistant), and the like. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 106, one or more program modules 108, and may include program data 110. For the present surface detail rendering technique, the program modules 108 may include one or more components 140 for implementing the surface detail rendering technique. In addition, program modules 108 may include a graphics application 142 that utilizes the surface detail rendering technique implemented within components 140. Alternatively, the operating system 106 may include one or more components for implementing the surface detail rendering technique. Program data 110 may include leap texture data 150 and other graphic modeling data 152, such as a triangle mesh. This basic configuration is illustrated in FIG. 1 by those components within dashed line 112.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 120 and non-removable storage 122. Computer storage media may include volatile and nonvolatile, removable and non-removable media implemented in any method or technology for storage of information, such as computer readable instructions, data structures, program modules, or other data. System memory 104, removable storage 120 and non-removable storage 122 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100.

Computing device 100 may also have input device(s) 124 such as keyboard, mouse, pen, voice input device, touch input device, etc. For example, computing device 100 may include a data capture device as an input device. The data capture device may be a digital/electronic still camera, a video camera, a film/photographic scanner, or the like. The data capture device may be configured to capture a single or a sequence of images. In addition, there may be multiple data capture devices of various types connected in order to capture multiple views of an image simultaneously or sequentially, to capture three-dimensional or depth images, and/or to capture panoramic images of a scene. The images captured by the data capture device may then be stored as image data within computing device 100 via an appropriate interface, such as USB, IEEE 1394, BLUETOOTH, or the like. Output device(s) 126 such as a display, speakers, printer, etc. may also be included. These devices are well known in the art and are not discussed at length here.

Computing device 100 may also contain communication connections 128 that allow the device to communicate with other computing devices 130, such as over a network. Communication connection(s) 128 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 2:
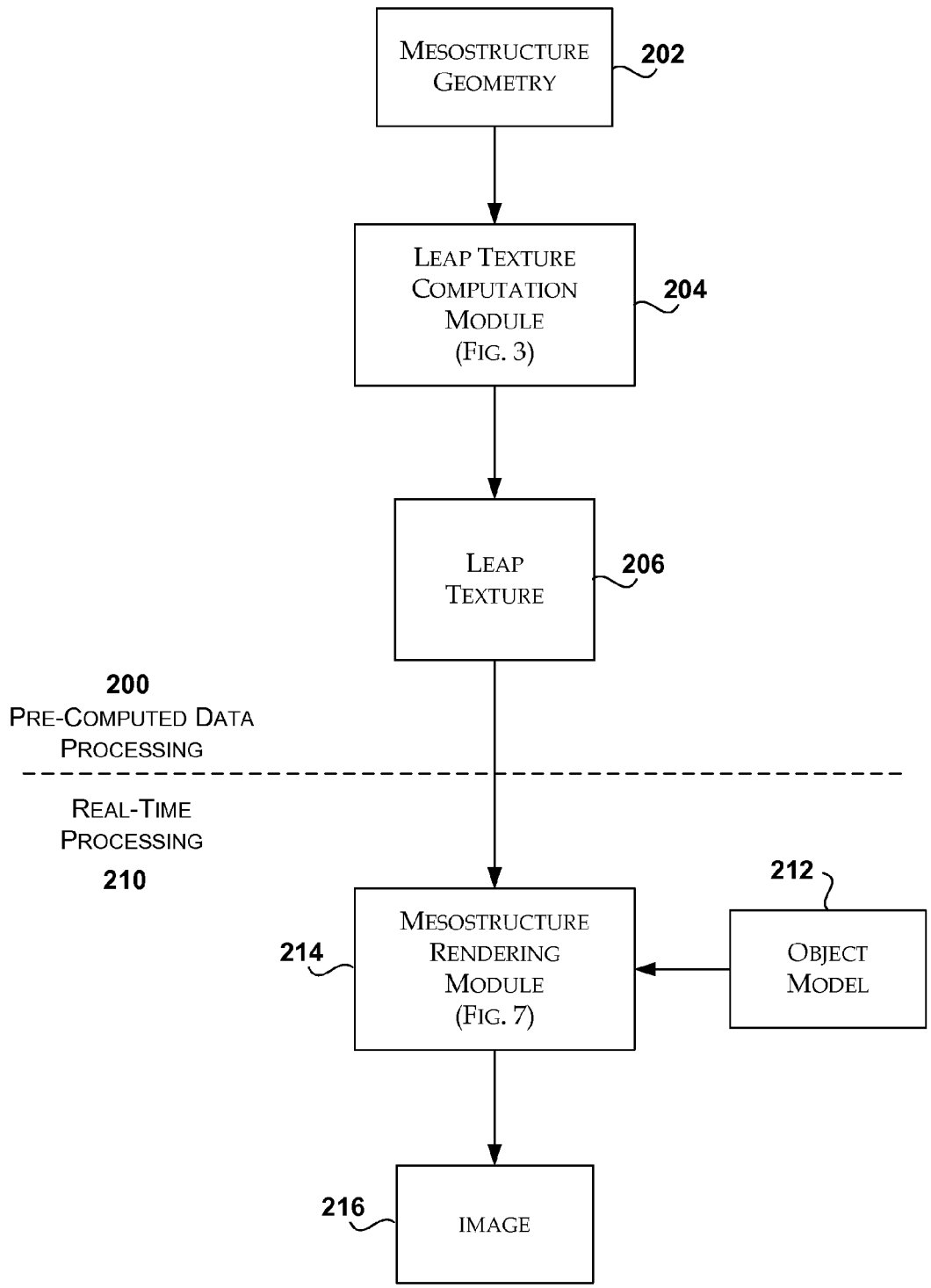
FIG. 2 is a block diagram illustrating exemplary program modules and program data for implementing the present surface detail rendering technique within the computing device shown in FIG. 1.

FIG. 2 is a block diagram illustrating exemplary program modules and program data for implementing the present surface detail rendering technique within the computing device shown in FIG. 1. The block diagram is divided into a top portion and a bottom portion separated by a dashed line. The top portion represents program modules and program data used for pre-computed data processing 200. The bottom portion represents program modules and program data used for real-time processing 210.

For pre-computed data processing 200, a leap texture computation module 204 inputs a mesostructure geometry 202 and outputs a leap texture 206 in accordance with the present surface detail rendering technique. Mesostructure geometry 202 may be one type of program data 152 illustrated in FIG. 1. As described above, mesostructure geometry 202 represents fine scale surface geometries. The mesostructure geometry may be any conventional type of mesostructure, such as tileable mesostructure samples, synthesized mesostructures, or the like. Briefly, leap texture computation module 204, illustrated in FIG. 3 and described in conjunction therewith, determines a value for each voxel of a volumetric texture (i.e., the mesostructure geometry), where a voxel is a volume element in three-dimensional space. Thus, a voxel is comparable to a pixel in two-dimensional space, but is in three-dimensional space.

For real-time processing 210, a mesostructure rendering module 214 has access to the leap texture 206 that was pre-computed and has access to an object model 212. The object model 212 is any conventional object model of arbitrary geometry that is represented by a triangle mesh that models an object. Briefly, mesostructure rendering module 214, illustrated in FIG. 7 and described in conjunction therewith, uses the leap texture 206 to iteratively jump step by step by a distance specified in the leap texture. As will be described below, the distance specified in the leap texture for a specified voxel is applicable for all view directions. In contrast, the pre-computed offset value stored in a five-dimensional generalized displacement mapping table stores an offset value for each voxel for each viewing direction. Thus, as will be described below, because the present surface detail rendering technique minimizes the amount of pre-computed data while still achieving photo-realistic images in real-time, the technique may be used in industrial applications with limited memory.

Figure 3:
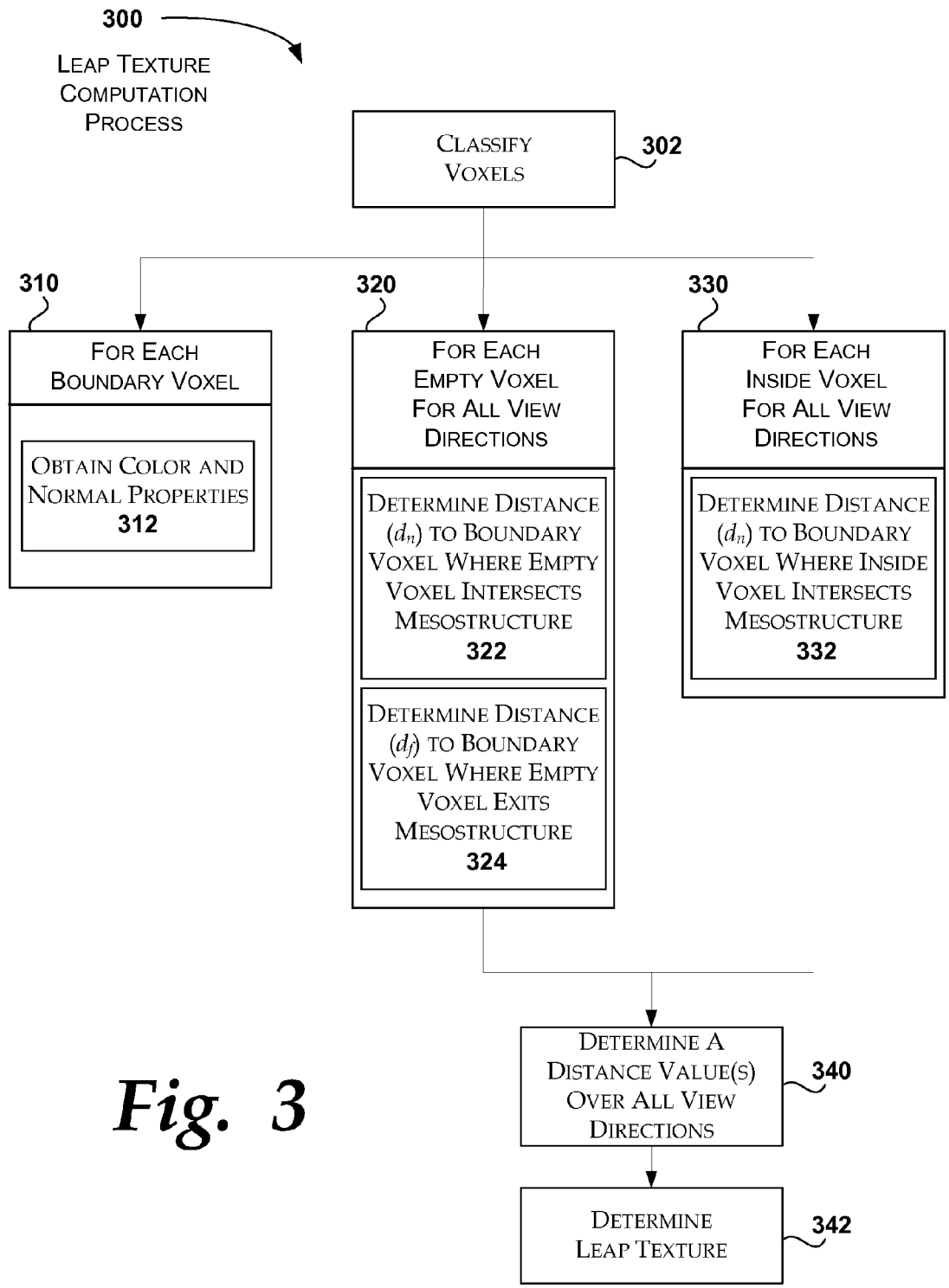
FIG. 3 is a flow diagram illustrating an exemplary leap texture computation process suitable for use in the leap texture computation module shown in FIG. 2.

FIG. 3 is a flow diagram illustrating an exemplary leap texture computation process suitable for use in the leap texture computation module shown in FIG. 2. As shown in FIG. 2, the leap texture computation module has access to a mesostructure geometry. At block 302, a voxel of the mesostructure geometry is classified into one of three different types: 1) a boundary voxel; 2) an empty voxel; or 3) an inside voxel. As the names imply, a boundary voxel is a voxel on the boundary of the mesostructure, an empty voxel is a voxel outside the mesostructure, and an inside voxel is a voxel within the mesostructure. Each of these three types of categories will be illustrated later in conjunction with FIGS. 4 and 5. The actual classification for all the voxels may be performed before any processing within blocks 310-344, in parallel with processing within blocks 310-344 once a voxel is classified, in sequence with processing within blocks 310-344 as a voxel is classified, or in various combinations of parallel and sequential order without departing from the present surface detail rendering technique. If a voxel is classified as a boundary voxel, processing continues at block 310 for that voxel. If a voxel is classified as an empty voxel, processing continues at block 320 for that voxel. If a voxel is classified as an inside voxel, processing continues at block 330 for that voxel. The processing for each type of voxel is now individually described.

At block 310, the leap texture computation process obtains a color and normal property for the boundary voxel. The color and normal properties are applied during rendering of the image.

At block 320, two distance measurements are determined for the empty voxel over all view directions. In block 322, an entrance distance is determined. The entrance distance is a measurement from the empty voxel to a boundary voxel along a ray cast from the empty voxel in a desired view direction. The boundary voxel is on the boundary of the mesostructure. In block 324, an exit distance is determined. The exit distance is a measurement from the empty voxel to another boundary voxel along the ray cast from the empty voxel in the desired direction. The other boundary voxel represents where the ray exits the mesostructure. These two distance measurements are determined for all view directions. The determination of these two distance measurements are illustrated and described later in conjunction with FIG. 4. Once block 320 is completed, processing for the empty voxel continues at block 340.

At block 330, a distance measurement is determined for the inside voxel over all view directions. In block 332, an inside distance for the inside voxel is determined. The inside distance is a measurement from the inside voxel to a boundary voxel along a ray cast from the inside voxel towards the view direction. The determination of this distance measurement is illustrated and described later in conjunction with FIG. 5. Once block 330 is complete, processing for the inside voxel also continues at block 340.

At block 340, a representative distance value is determined over all the view directions for both empty voxels and inside voxels. For example, the representative distance value may be an average of the distances calculated in blocks 320 and 330 for the empty voxel and inside voxel respectively. In another embodiment, shown in FIG. 5, the representative distance value may be a minimum distance determined over all the view directions. For an empty voxel, two representative distance values are determined. For an inside voxel, one representative distance value is determined. Processing continues at block 342.

At block 342, a leap texture for all the voxels is determined. Briefly, illustrated in FIG. 6 and described later in conjunction therewith, the leap texture stores one value for each voxel. That value is used during rendering to decorate the object with the mesostructure. The value is used for all viewing directions. Thus, the amount of pre-computed data is substantially decreased from techniques which store pre-computed data for each viewing direction. Blocks 320-344 are now described in further detail with reference to FIGS. 4-6.

Figure 4:
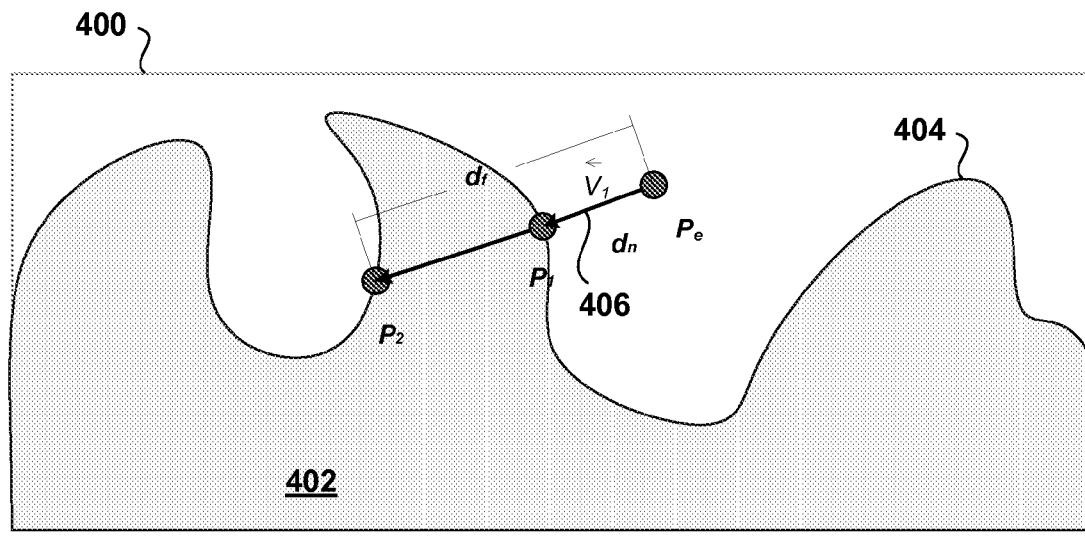
FIG. 4 is a set of graphic depictions of measurements for determining a leap texture for an empty voxel in accordance with the surface detail rendering technique described herein.
Figure 4:
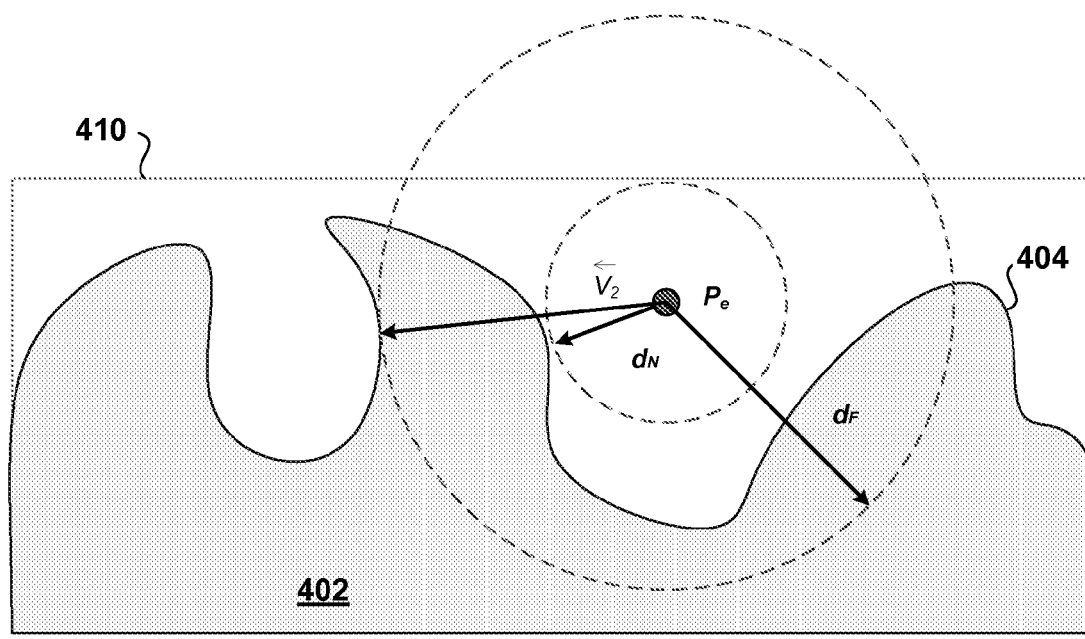

FIG. 4 is a set of graphic depictions 400 and 410 of measurements for determining a leap texture for an empty voxel in accordance with the surface detail rendering technique described herein. In graphic depiction 400, an empty voxel $P_e$ is shown outside of mesostructure 402. Mesostructure 402 is graphically illustrated as a shaded area under mesostructure boundary line 404. A ray 406 sent from empty voxel $P_e$ along view direction $\vec{V}_1$ intersects with a boundary voxel $P_1$ after a distance $d_n$. The distance from $P_e$ to $P_1$ represents the entrance distance for view direction $\vec{V}_1$. The ray 406 may then continue in the view direction $\vec{V}_1$ until exiting the mesostructure at another boundary voxel $P_2$. The distance $d_f$ from $P_e$ to $P_2$ represents the exit distance for view direction $\vec{V}_1$. Values for these two distance measurements are then determined for all view directions $\vec{V}=(\theta, \phi)$ expressed in spherical angles, where the polar angle $\theta$ ranges from 0 to $\pi$ and the azimuth angle $\phi$ ranges from 0 to $2\pi$. For either or both of these two distance measurements, if an intersection does not occur, the distance measurement is set to a pre-determined value that indicates no intersection. A conventional ray-casting technique is applied to compute the distances.

Graphic depiction 410 illustrates the minimum distances for empty voxel $P_e$ over all the view directions. Distance $d_N$ is defined as the minimum entrance distance $d_n$ over all the view directions: $d_N=\{min d_n | \forall V\}$. Distance $d_F$ is defined as the minimum exit distance $d_f$ over all the view directions: $d_F=\{min d_f | \forall V\}$. As one can see, in the illustrated example, view direction $\vec{V}_1$ ultimately yields the minimum entrance distance $d_N$, whereas another view direction $\vec{V}_2$ yields the minimum exit distance $d_F$. Thus, the leap texture may be based on distances from different view directions for any voxel.

Figure 5:
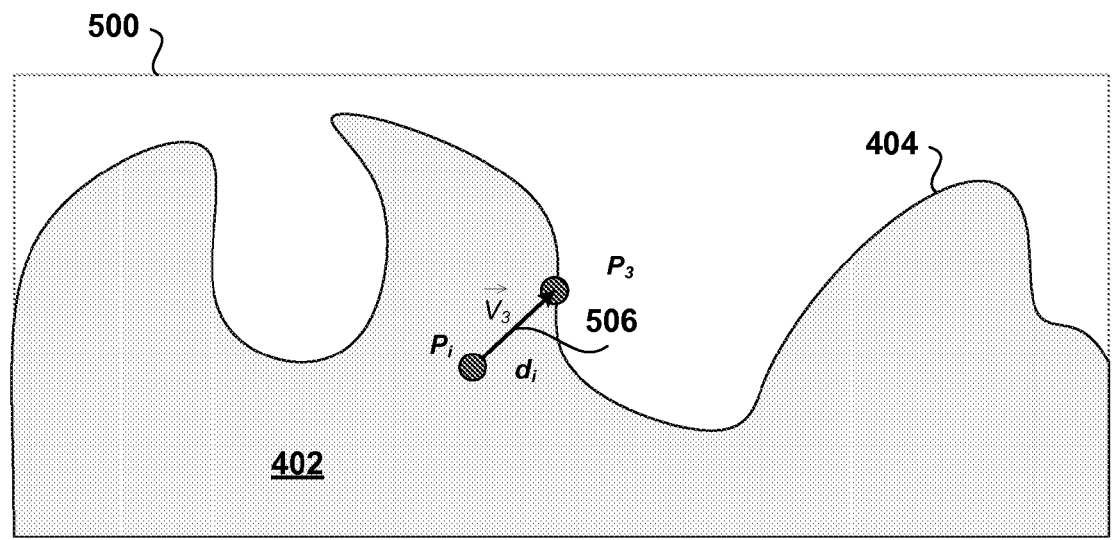
FIG. 5 is a set of graphic depictions of measurements for determining a leap texture for an inside voxel in accordance with the surface detail rendering technique described herein.
Figure 5:
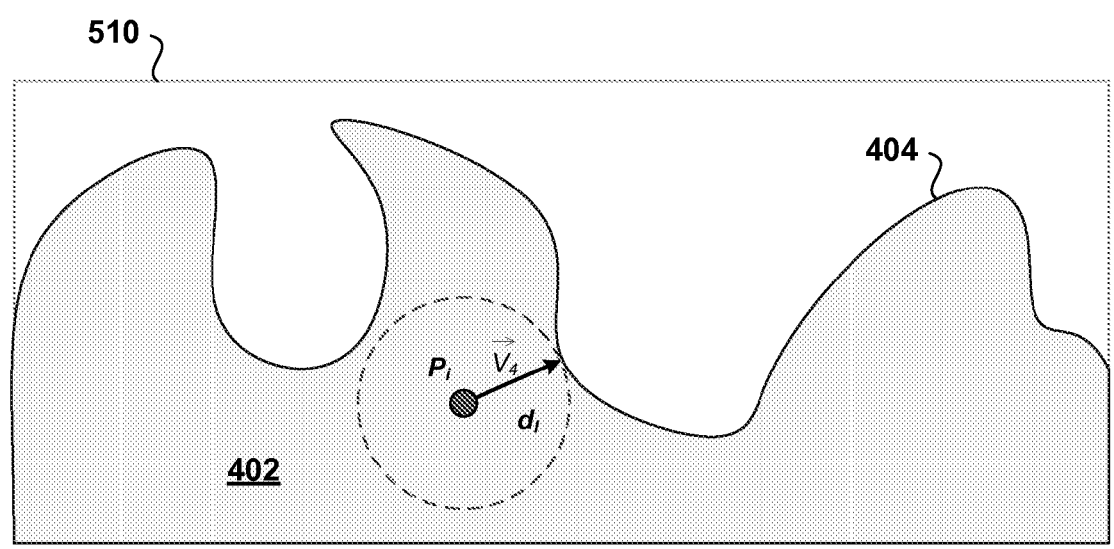

FIG. 5 is a set of graphic depictions 510 and 510 of measurements for determining a leap texture for an inside voxel in accordance with the surface detail rendering technique described herein. In graphic depiction 500, an inside voxel $P_i$ is shown inside mesostructure 402. Again, mesostructure 402 is graphically illustrated as a shaded area under mesostructure boundary line 404. A ray 506 sent from inside voxel $P_i$ along view direction $\vec{V}_3$ intersects with a boundary voxel $P_3$ after a distance $d_i$. The distance from $P_i$ to $P_3$ represents the inside distance. A value for this distance measurement is then determined for all view directions $\vec{V}=(\theta, \phi)$ expressed in spherical angles, where the polar angle $\theta$ ranges from 0 to $\pi$ and the azimuth angle $\phi$ ranges from 0 to $2\pi$. Again, if an intersection does not occur, the distance measurement is set to a pre-determined value that indicates no intersection. Graphic depiction 510 illustrates the minimum inside distance for voxel $P_i$. Distance $d_1$ is defined as the minimum inside distance $d_i$ over all the view directions: $d_1=\{min d_i | \forall V\}$. As one can see, view direction $\vec{V}_4$ ultimately yielded the minimum inside distance $d_I$.

The leap texture $d(x,y,z)$ is a scalar field in the space of the volumetric texture. In other words, given a starting voxel and a viewing direction, the leap texture hints at a jumping step for a ray starting from the starting voxel which will allow the ray to reach a boundary voxel as quickly as possible. In addition, the leap texture ensures that the first intersection with a boundary voxel is the first intersection. In one embodiment, the value stored in the leap texture for an empty voxel is a positive value and the value stored in the leap texture for an inside voxel is a negative value. As one can appreciate upon viewing FIG. 4, $d_N$ is a conservative approximation for a jump step and $d_F$ is an aggressive approximation for the jump step. Thus, in one embodiment, the present technique introduces a variable α for approximating the jump step for an empty voxel. By using variable α, the value represents a suitable jump step that minimizes the number of jumps. Variable α depends on the mesostructure and can be chosen via experimentation. A value of 0.25 has been used to obtain successful results.

Figure 6:
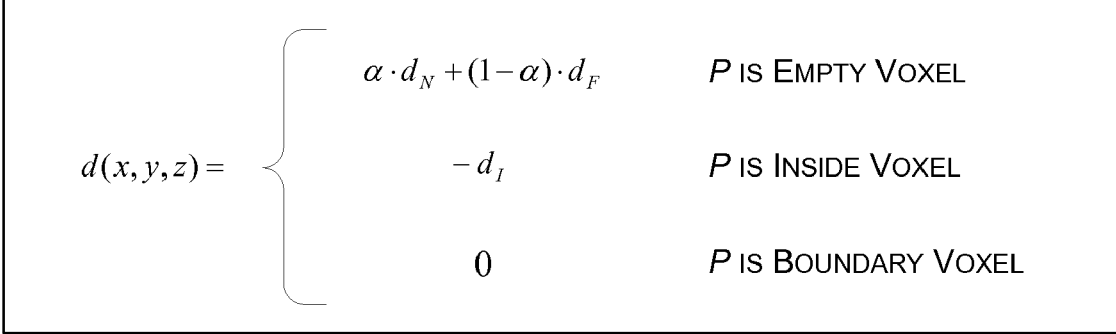
FIG. 6 illustrates an exemplary definition for the leap texture of each voxel based on the measurements depicted in FIGS. 4 and 5.

FIG. 6 illustrates an exemplary definition 600 for the leap texture of each voxel based on the measurements depicted in FIGS. 4 and 5. Thus, the value for any boundary voxel is zero, the value for any inside voxel is the negative of the minimum distance $d_I$, and the value for any empty voxel is defined as: $\alpha \cdot d_N + (1-\alpha) \cdot d_F$. Once this leap texture is defined for each voxel, the leap texture can be used to apply the mesostructure in real-time to an object in order to render a photo-realistic image.

Figure 7:
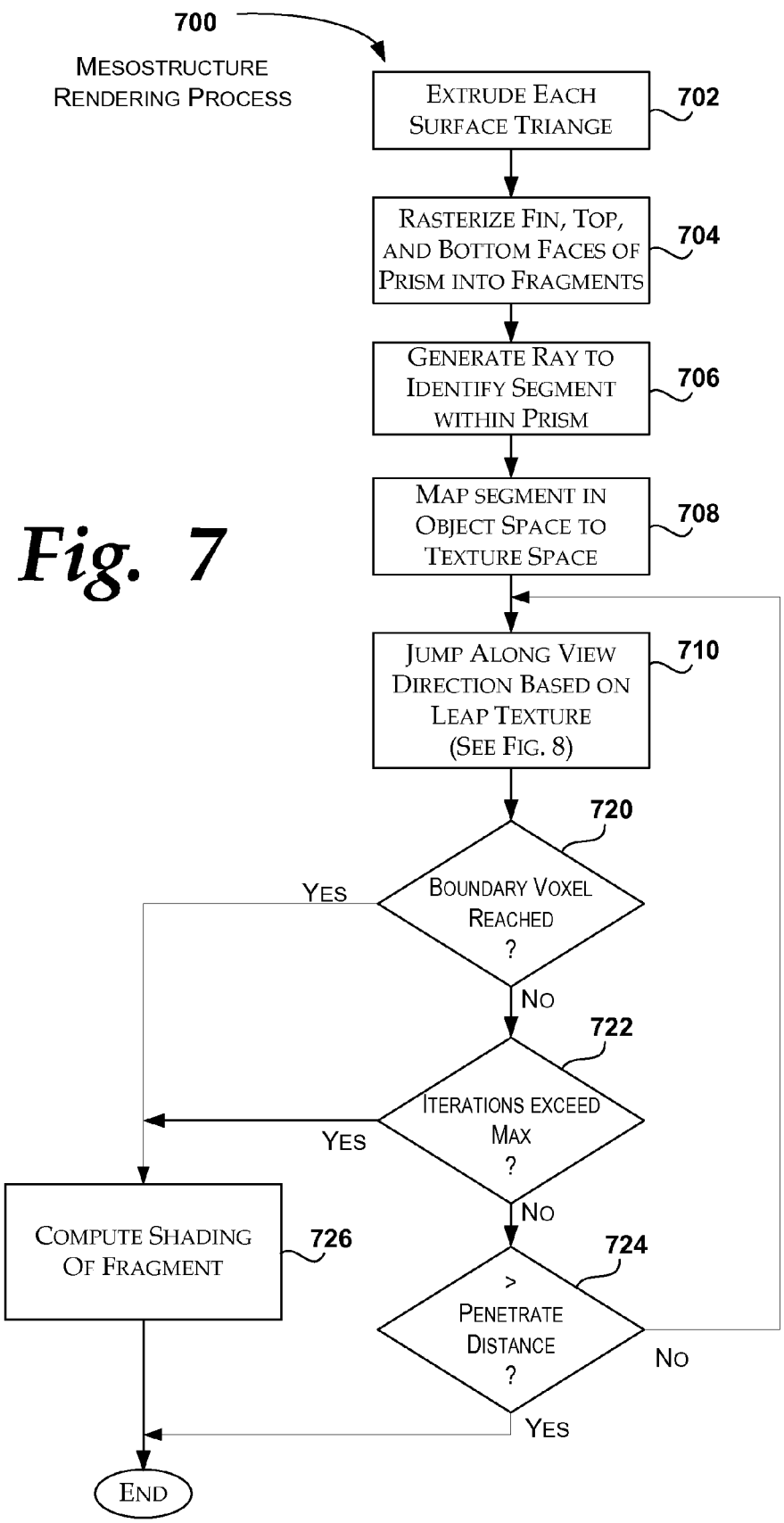
FIG. 7 is a flow diagram illustrating an exemplary mesostructure rendering process suitable for use in the mesostructure rendering module shown in FIG. 2.

FIG. 7 is a flow diagram illustrating an exemplary mesostructure rendering process suitable for use in the mesostructure rendering module shown in FIG. 2. The present surface detail rendering technique does not trace rays through mesostructures synthesized onto a surface, nor does it involve formation of numerous volume texture slices. Instead, in overview, the technique rapidly processes ray segments in each extruded prism using the leap texture. As shown in FIG. 2, the mesostructure rendering module accesses input from an object model and from the leap texture. Processing begins at block 702.

At block 702, the object model, represented as a triangle mesh, has each of its triangles extruded along the vertex normal direction of each surface triangle. Thus, each surface triangle becomes a 3-dimensional triangular prism. Thus, the mesostructure for each prism in the object space is given by a corresponding volume in the texture space. The bilinear prism fins are each approximated by two mesh triangles. Each fin (i.e., side face of the prism) is shared by two prisms, and its normal directions are defined outwards with respect to the prism being processed. Processing continues at block 704.

At block 704, the faces of the triangular prism are rasterized into fragments for processing in a pixel pipeline. In one embodiment, the faces may include the fin, top, and bottom faces. While rasterization utilizes conventional procedures known to those skilled in the art, one should note that in accordance with the present rendering technique each fragment is individually processed. Processing continues at block 706.

Figure 9:
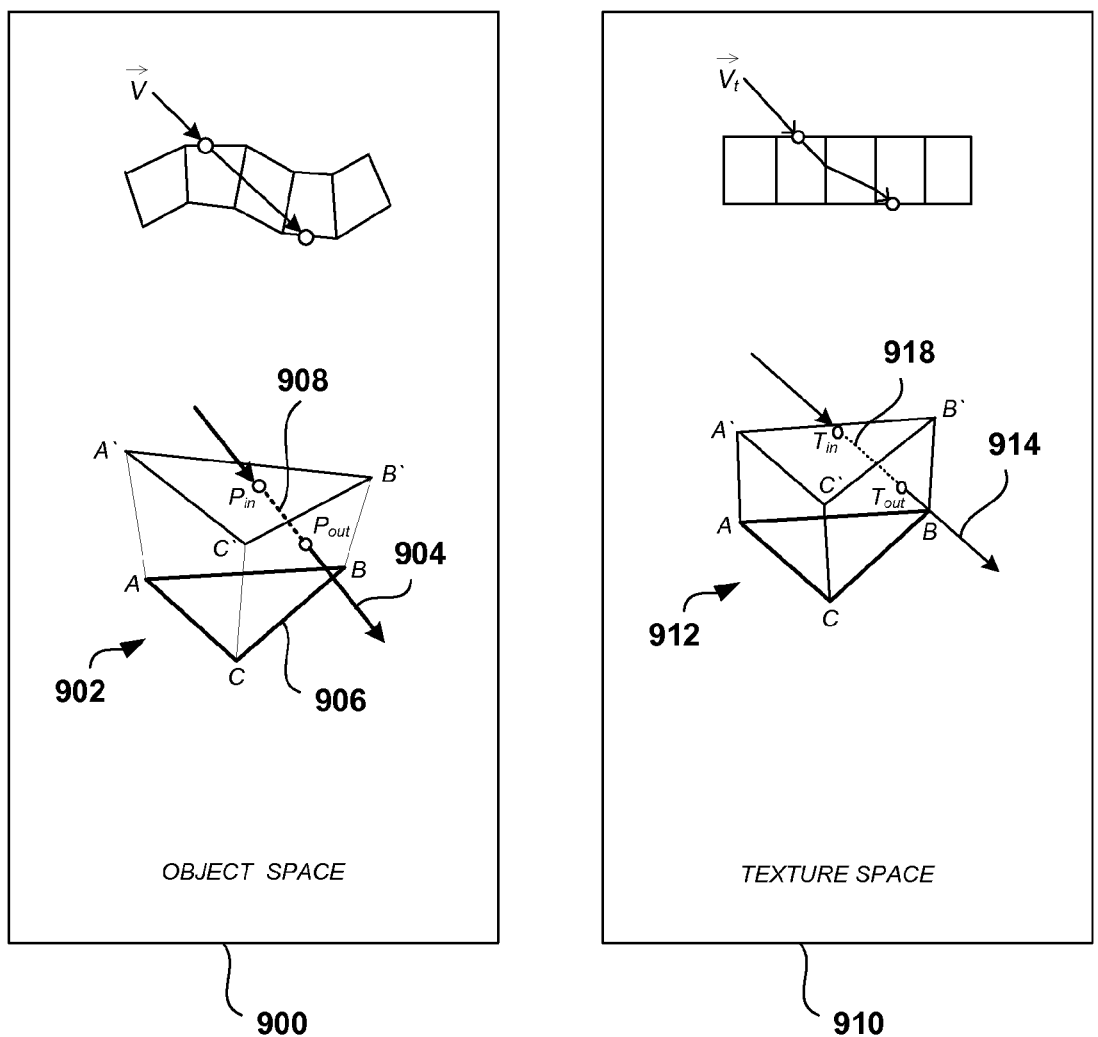
FIG. 9 is a graphic depiction of a ray in object space that is mapped to a corresponding ray in texture space.

At block 706, a ray is generated from a desired view direction through each voxel of each triangular prism. Briefly, referring to FIG. 9, the ray 904 enters the triangular prism at $P_{in}$ and exits the triangular prism at $P_{out}$ to form a segment 908 within the triangular prism. Processing continues at block 708.

At block 708, because the mesostructure geometry is not explicitly represented in object space, each segment 908 in a prism is mapped to a corresponding segment 918 in texture space to determine intersections with the mesostructure geometry. Again, referring to FIG. 9, ray 914 of the texture volume 912 enters the texture volume at $T_{in}$ and exits the texture volume at $T_{out}$. In general, the corresponding segment in texture-space is approximated as a straight-line segment between the ray entrance and exit points of the volumetric texture. The mesostructure intersection point of its cast ray, as well as the texture value, needs to be computed in order to later render each pixel. The intersections points may be calculated using the technique used for the five-dimensional generalized displacement map. Processing continues at block 710.

Figure 8:
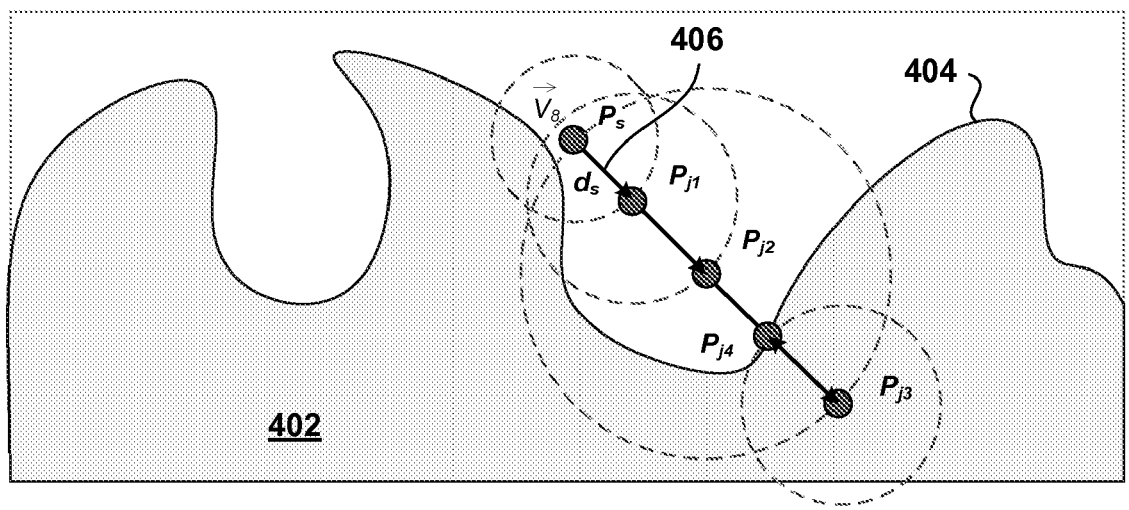
FIG. 8 is a graphic depiction of the surface detail rendering technique using the leap texture as described herein.

At block 710, the ray in the viewing direction in the texture space jumps iteratively step by step based on the values in the leap texture. This is in contrast with the generalized displacement mapping technique where the ray jumps directly to a boundary voxel in one step using the pre-computed offset value stored in the five-dimensional generalized displacement mapping table. For the present technique, each iterative jump along the view direction V is determined based on the following equation: $P_n = P_{n-1} + V \cdot d(P_{n-1})$, where $P_{n-1}$ is obtained from the leap texture. FIG. 8, described later, explains how the leap texture is used to iteratively jump step by step. Because computing the ray path in object space accounts for variations in surface curvature and texture warping, the joint use of object and texture space for determining ray intersections using the leap texture is efficient and reduces texture distortion.

After each iteration (block 710), termination conditions may be considered. While there may be any number of termination conditions, process 700 illustrates three possible termination conditions: decision blocks 720, 722, 724.

At decision block 720, a determination is made whether a boundary voxel has been reached. If a boundary voxel has been reached, mesostructure rendering for that fragment proceeds to block 726. If the boundary voxel has not been reached, processing continues to decision block 722.

At decision block 722, a determination is made whether a pre-determined number of iterations (e.g., ten) has been reached. For example, a developer may set a maximum number of iterations for jumping during the fragment program loop for each fragment. If the maximum iterations have been reached, processing for that fragment proceeds to block 726. If the maximum iterations have not been reached, processing continues to decision block 724.

At decision block 724, a determination is made whether the sum of all the jump distances is larger that a penetrate distance. The penetrate distance refers to the boundary of the current prism. In one embodiment, the penetrate distance $d_t$ is calculated as the absolute difference between the distance to an entry boundary voxel and an exit boundary voxel. If the sum is less than the penetrate distance, processing continues back to block 706 for another iteration. However, if the sum is greater than the penetrate distance, processing ends for that fragment. In that case, the shading computation performed in block 726 is skipped for that fragment.

Block 726 is now described. At block 726, the shading of the fragment is computed. Any conventional shading technique may be implemented. In one embodiment, Phong shading is used to compute the color for the fragment. If block 726 is entered from decision block 720 (i.e., a boundary voxel was reached), the color and normal of the boundary voxel is propagated to all the voxels inside the volumetric sample using a standard four conjunction propagation method known to those skilled in the art of image processing. If block 726 is entered from decision block 722 (i.e., the maximum number of iterations has been reached), the color and normal at the last position of the ray is used for the shading computation. Once the shading computation is complete, processing for this fragment ends. Processing for other fragments continue independently.

FIG. 8 is a graphic depiction 800 of the surface detail rendering technique using the leap texture as described herein. In graphic depiction 800, a starting voxel $P_S$ is shown outside mesostructure 402. Again, mesostructure 402 is graphically illustrated as a shaded area under mesostructure boundary line 404. A ray sent from starting voxel $P_S$ along view direction $\vec{V}_g$ jumps to voxel $P_{j1}$ after the first iteration. The distance $d_S$ from starting voxel $P_S$ and voxel $P_{j1}$ is the value stored in the leap texture for starting voxel $P_S$. On the second iteration, the jump distance is the value stored in the leap texture for voxel $P_{j1}$ resulting in jumping to voxel $P_{j2}$. On the third iteration, the jump distance is the value stored in the leap texture for voxel $P_{j2}$ resulting in jumping to inside voxel $P_{j3}$. Thus, the offset distance equals the three values from the leap texture which were all positive values. On the fourth iteration, the jump distance is the value stored in the leap texture for inside voxel $P_{j3}$ resulting in jumping to boundary voxel $P_{j4}$. Thus, in the example shown, the desired boundary voxel was obtained after four iterations using the leap texture.

As described, the present surface detail rendering technique using leap textures may be used in place of five-dimensional general displacement map techniques when rendering real-time images with mesostructures. Thus, a mesostructure renderer using a pre-computed multi-dimensional "generalized displacement map" may instead use a leap texture as described herein. The render can than provide real-time rendering of highly detailed non-height-field mesostructures for rendering the mesostructure textures onto open or closed surfaces of arbitrary geometry. As one skilled in the art will appreciate, height-field mesostructures may be represented as a non-height-field mesostructure. Thus, the present technique can describe a range of surface geometries that include weave patterns and slanted protrusions. In rendering the mesostructures, the pre-computed leap texture facilitates texture coordinate computation of viewing rays whose piece-wise linear trajectory in texture space is determined in object space according to the shape of a base mesh upon which the mesostructure texture is to be rendered. Thus, the present surface detail rendering technique computes mesostructure visibility jointly in object space and texture space which enables both control of texture distortion and efficient computation of texture coordinates and shadowing. Local and global illumination can be computed for the present technique using the illumination techniques for the five-dimensional generalized displacement map.

While example embodiments and applications have been illustrated and described, it is to be understood that the invention is not limited to the precise configurations and resources described above. Various modifications, changes, and variations apparent to those skilled in the art may be made in the arrangement, operation, and details of the disclosed embodiments herein without departing from the scope of the claimed invention.

What is claimed is:

1. A computer-storage medium having instructions stored thereon for execution by a processor to perform a method for generating a representation of a mesostructure for use in rendering a synthesized image, the method comprising:
   calculating both an entrance distance and an exit distance when the voxel is located outside the mesostructure, where the entrance distance is measured from the voxel to a closest intersection of the mesostructure along a desired view direction and the exit distance is measured from the voxel to a farthest intersection of the mesostructure along the desired view direction; and
   determining a value for each voxel of a volumetric texture of the mesostructure based, in part, on both the entrance distance and the exit distance, wherein the value represents a jump distance for the voxel along the desired view direction when a model is decorated with the mesostructure.

2. The computer-storage medium as recited in claim 1, wherein the value is further based on an inside distance, where the inside distance is measured from the voxel to a boundary of the mesostructure along the desired view direction when the voxel is located inside the mesostructure.

3. The computer-storage medium as recited in claim 1, further comprising calculating a first representative distance such that the value for each voxel is further based on the first representative distance, the first representative distance being an average of the entrance distances calculated over a plurality of view directions.

4. The computer-storage medium as recited in claim 3, further comprising calculating a second representative distance such that the value for each voxel is further based on the second representative distance, the second representative distance being an average of the exit distances calculated over the plurality of view directions.

5. The computer-storage medium as recited in claim 4, wherein the value is further based on a variable that depends on the mesostructure.

6. The computer-storage medium as recited in claim 1, wherein the representation of the mesostructure is pre-computed.

7. The computer-storage medium as recited in claim 1, wherein the representation of the mesostructure comprises a three-dimensional texture.

8. A computer-storage medium having instructions stored thereon for execution by a processor to perform a method for rendering surface detail on an object, the method comprising:
   creating a volume from a surface triangle of a triangle mesh representing the object;
   determining a value for each of a plurality of voxels within a volumetric texture of a mesostructure, the value representing a jump distance for an associated voxel for any desired view direction such that a ray cast from the associated voxel in the desired view direction ends at a next voxel that is the jump distance away from the associated voxel;
   pre-computing a three-dimensional texture comprised of the values for each of the plurality of voxels; and applying the mesostructure onto the volume using the pre-computed three-dimensional texture.

9. The computer-storage medium as recited in claim 8, wherein rendering further comprises iteratively obtaining the value for the next voxel and jumping the corresponding jump distance in the view direction until a boundary voxel is reached.

10. The computer-storage medium recited in claim 9, wherein iteratively jumping ends after a pre-determined number of iterations and the boundary voxel has not been reached.

11. The computer-storage medium as recited in claim 9, wherein the boundary voxel is determined by having the value of zero in the three-dimensional texture for the boundary voxel.

12. The computer-storage medium as recited in claim 9, wherein iteratively jumping ends if a sum of all the jump distances is greater than a penetrate distance.

13. The computer-storage medium as recited in claim 8, wherein creating the volume comprises extruding the surface triangle along a vertex normal direction of the surface triangle.

14. The computer-storage medium as recited in claim 8, further comprising rasterizing a plurality of faces of each triangular prism into a plurality of fragments and applying the mesostructure to each of the plurality of fragments.

15. A computing device, comprising:
   a processor;

a memory into which a plurality of instructions are loaded, the plurality of instructions performing a method of rendering a mesostructure onto an object when executed by the processor, the mesostructure being defined by a mesostructure geometry, the method comprising:

a) extruding each surface mangle of a triangle mesh to create a triangular prism, the triangle mesh representing an object model of the object b) generating a ray from a desired view direction V through each rasterized pixel of each front triangle of each triangular prism to identify segment of each ray that is within the triangular prism;

c) mapping each segment to a corresponding ray segment in texture space; and d) determining intersections of the corresponding ray segment with the mesostructure at a boundary voxel through iterative jumps based on a leap texture, the leap texture defining a value for each voxel within the mesostructure geometry, where the value represents a distance to jump along the corresponding ray segment in the desired view direction.

16. The system of claim 15, wherein the value is based on a location of the voxel within the mesostructure geometry.

17. The system of claim 16, wherein the location of the voxel is on a boundary of the mesostructure and the value is zero.

18. The system of claim 16, wherein the location of the voxel is within the mesostructure and the value is based on a minimum distance from the voxel to a boundary voxel calculated over a plurality of view directions for the voxel.

19. The system of claim 16, wherein the location of the voxel is outside the mesostructure and the value is based on a minimum entrance distance from the voxel to a boundary voxel calculated over a plurality of view directions for the voxel and a minimum exit distance where the voxel exits the mesostructure calculated over a plurality of view directions for the voxel.

* * * * *